United States Patent [19]

Nikkel et al.

[11] Patent Number: 5,732,780
[45] Date of Patent: Mar. 31, 1998

[54] IMPLEMENT FOR MAKING ANGLED WATER RETENTION DEPRESSIONS AND MOUNDS

[75] Inventors: Lee F. Nikkel; Eugene H. Schmidt, both of Madrid; David R. Long, North Platte, all of Nebr.

[73] Assignee: A.I.L. Inc., North Platte, Nebr.

[21] Appl. No.: 711,254

[22] Filed: Sep. 9, 1996

[51] Int. Cl.[6] .................................................. A01B 35/16
[52] U.S. Cl. ................................................ 172/177; 172/540
[58] Field of Search .................................. 172/540, 177, 172/554, 556, 518, 21, 173

[56] References Cited

U.S. PATENT DOCUMENTS

| | | |
|---|---|---|
| 188,815 | 3/1877 | Nichols ................................ 172/540 |
| 510,266 | 12/1893 | Keizer . |
| 577,273 | 2/1897 | Swanstrom ........................... 172/540 |
| 2,098,738 | 11/1937 | Campbell . |
| 2,146,222 | 2/1939 | Pace . |
| 2,176,984 | 10/1939 | Adkinson . |
| 2,187,262 | 1/1940 | Brown . |
| 2,193,275 | 3/1940 | Elliott . |
| 2,196,038 | 4/1940 | Silver . |
| 2,233,331 | 2/1941 | Vratil . |
| 2,236,832 | 4/1941 | Neilsen . |
| 2,325,997 | 8/1943 | Kelly et al. . |
| 2,362,728 | 11/1944 | Smith . |
| 2,613,585 | 10/1952 | Calkins . |
| 2,663,131 | 12/1953 | Johnson . |
| 2,708,866 | 5/1955 | Shonts . |
| 2,780,975 | 2/1957 | Gunning . |
| 2,928,484 | 3/1960 | Blocker . |
| 3,245,478 | 4/1966 | Thompson . |
| 3,403,737 | 10/1968 | Byrd . |
| 3,605,907 | 9/1971 | Schuring et al. .................... 172/540 X |
| 3,853,419 | 12/1974 | Bertram et al. ..................... 172/540 X |
| 3,922,106 | 11/1975 | Caron et al. ........................ 172/540 X |
| 4,019,755 | 4/1977 | Eisenhardt . |
| 4,102,406 | 7/1978 | Orthman ............................... 172/540 |
| 4,195,695 | 4/1980 | Dixon .................................. 172/554 X |
| 4,213,408 | 7/1980 | West et al. ........................... 172/540 X |
| 4,213,502 | 7/1980 | Gibson . |
| 4,508,177 | 4/1985 | Wiser .................................. 172/540 X |
| 4,991,660 | 2/1991 | Horváth et al. .................... 172/540 X |
| 5,267,517 | 12/1993 | Jones .................................. 172/540 X |

FOREIGN PATENT DOCUMENTS 60365  11/1957  India .

Primary Examiner—Terry Lee Melius
Assistant Examiner—Christopher J. Novosad
Attorney, Agent, or Firm—Greer, Burns & Crain, Ltd.

[57] ABSTRACT

Apparatus is disclosed which is adapted to form a series of angled depressions with raised sides in the row space between adjacent row lines of a row crop. The depressions and raised mounds between them are oriented at an acute angle relate to the row line, to present a generally uniform surface for subsequent farming operation which minimizes machine and operator jostling, while effectively retaining water where it falls, and nutrients, herbicides and the like where they are applied.

15 Claims, 2 Drawing Sheets

IMPLEMENT FOR MAKING ANGLED WATER RETENTION DEPRESSIONS AND MOUNDS

The present invention relates to agricultural implements and more particularly to an apparatus for forming water retaining depressions and associated raised mounds in an agricultural field.

A long existing problem in farming, and particularly in the farming of row crops, such as corn, soybeans, sugar beets, vegetables and others, is the problem of minimizing water run-off, particularly in hilly fields which are prevalent throughout many areas of the country. Run-off can occur during rainstorms, as well as during irrigation, and produces undesirable results in several respects. Such run-off can produce soil erosion and can also affect the eventual yield of the crop for several reasons. Not only is the water not retained at the higher elevations in a field for the plants that are located there, but the run-off water may puddle in the lower elevations and virtually drown the plants located there.

The run-off water not only carries away soil, which can produce severe erosion of the field, but also carries away fertilizer, herbicides and other materials that may have been applied to the field. Obviously, if these materials, which are usually expensive, are moved from the location where they were applied, the expected benefits will not be obtained.

Because of these problems, there have been attempts to minimize run-off by implements which create depressions which extend from row line to row line, in effect creating a series of small dams in the row space between adjacent rows and this has the desired effect of reducing run-off. However, it has been found that for certain crops, such as potatoes for example, when the transverse depressions are made at the same location in the lengthwise direction of the rows, run-off can occur from one depression across the row line to the depression in the adjacent row space.

Since such depressions are generally formed early in the growing season for a crop, it should be appreciated that there will be subsequent farming operations done in the field in which the transverse depressions are made, not the least of which is the expected harvesting of the crop. It has been found that such transverse depressions produce a very rough surface for a subsequent farming operation, it being understood that the wheels of a tractor follow the row space between the adjacent row lines as it travels through the field. Such transverse depressions in the row space create a very bumpy surface upon which the vehicle is forced to travel. While deeper depressions desirably form bigger reservoirs for retaining the water, the deeper depressions also produce a bumpier surface. This is not an insignificant problem, for such surfaces have been known to damage vehicles and wagons, for example, the latter of which are used to carry the harvested crop. The bouncing, jostling and vibration can not only damage equipment, but can also be very uncomfortable for the operator of a vehicle.

Accordingly, it is a primary object of the present invention to provide an improved apparatus for forming elongated depressions, which apparatus is superior to the prior art apparatus for the reason that it effectively and efficiently creates elongated depressions which are oriented at an acute angle relative to the direction of the rows and also forms raised damn-like mounds between depressions along the sides of the depressions.

Another object of the present invention is to provide such an improved apparatus, which because of the angular orientation of the mounds and depressions, presents a surface over which tractor wheels and other wheels can ride which does not produce the vibration, jostling and bouncing effects that are common with transverse depressions formed by prior art apparatus.

Still another object of the present invention is to provide such an improved apparatus which can be simply and easily installed on existing implements, such as a cultivator apparatus used in cultivating row crops such as corn, and which can be easily lifted from engagement with the ground as the cultivator is lifted.

Another object of the present invention is to provide such an improved apparatus which can be vertically rotated out of operation relative to the implement on which it is attached, if desired.

Yet another object of the present invention is to provide such an improved apparatus which is inexpensively manufactured from commonly available parts and which produces superior results. A related object of the present invention lies in the provision for making easy and inexpensive repairs in the event that the apparatus is damaged.

Other objects and advantages will become apparent upon reading the following detailed description, while referring to the attached drawings, in which.

DETAILED DESCRIPTION OF THE PREFERRED EMBODIMENT

Broadly stated, the present invention is particularly adapted to form a series of acutely angled depressions with raised sides in the row space between adjacent row lines of a row crop as the apparatus travels down the field in operating engagement. While the present invention will be shown and described in connection with its operation in a row crop environment, it should be understood that it can be used in a non-rowed, open field if desired and accomplish the same desirable effects. Also, while the apparatus is shown as being attached to a cultivator having a cultivator blade which cuts through the soil ahead of the present invention, it is not critical that such a cultivator blade or similar ripping blade be utilized. However, it has been found during operation that the formation and shape of the depressions and adjacent mounds are optimized when such a blade is utilized, for the primary reason that it is easier to work many kinds of soils if it is broken up prior to being worked by the present invention.

It should also be appreciated that while the drawings illustrate a single apparatus which would be used for a single row space between adjacent rows or a single area along a field if row crops were not involved, it should be understood that many farm implements work multiple rows and in such event, there would preferably if not necessarily be an apparatus provided for each row space that is otherwise being worked by the implement during a farming operation. Stated in other words, and more simply, if a cultivator implement that was an eight row cultivator had the present invention installed, there would preferably be nine of such apparatus for the eight rows, with an apparatus being on the outside of each of the end rows. While this necessarily means that during a subsequent pass during a farming operation, one row space would be worked twice, that is the necessary effect, because of the fact that farming operations nearly always go back and forth along adjacent passes.

Also, as will be appreciated from the following detailed description, the blades of the apparatus are positioned at an angle relative to the direction of travel through the field and by virtue of the angular orientation, tend to exert a sideways or lateral force on the implement. Such forces can be significant and have the effect of pulling the implement to one side. For this reason, the apparatus desirably has blades that are positioned right and left so that the net effect is to neutralize the lateral forces on the implement. Obviously, when nine apparatus are mounted on an eight row cultivator, there is necessarily one more right or left oriented apparatus, but such a single unneutralized lateral force has been shown to be acceptable.

Figure 1:
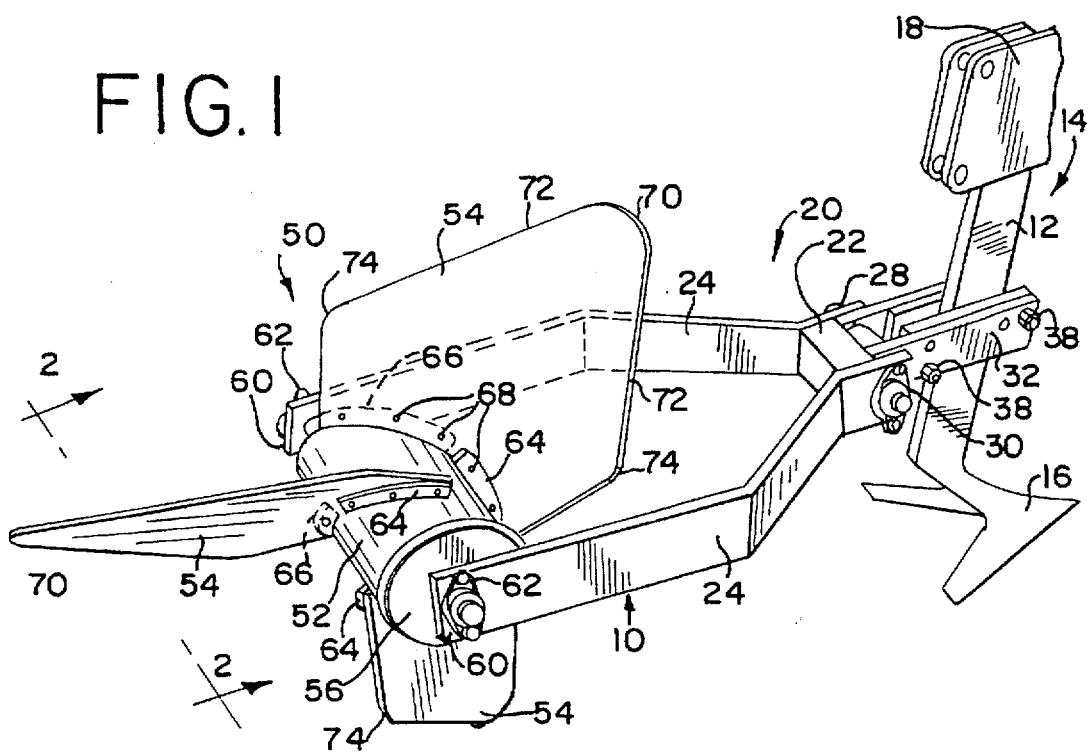
FIG. 1 is a perspective view of the apparatus embodying the present invention and is shown attached to the shank of a blade of a cultivator implement.
Figure 2:
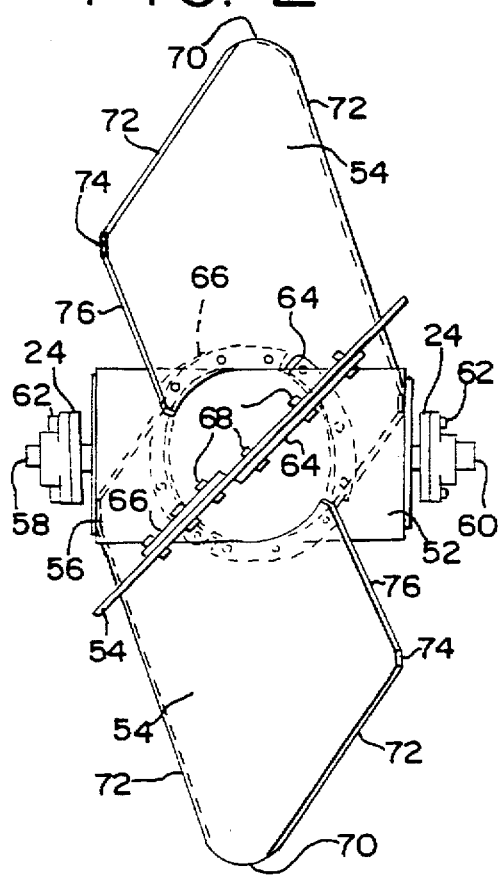
FIG. 2 is a left end view of the apparatus shown in FIG. 1.

Turning now to the drawings, and particularly FIG. 1, the apparatus, indicated generally at 10, is shown mounted to a shank 12 of a portion of a cultivator implement, indicated generally at 14, which cultivator implement has a ripping blade 16 that is integrally formed with the shank 12. The cultivator shank 12 is carried by a frame structure 18 that is a part of the cultivator implement 14 that includes a number of such shanks and blades for farming a plurality of rows of crops. The frame structure 18 typically can be raised out of the ground, such as at the end of the road or for carrying the implement over the road or from field to field.

Figure 4:
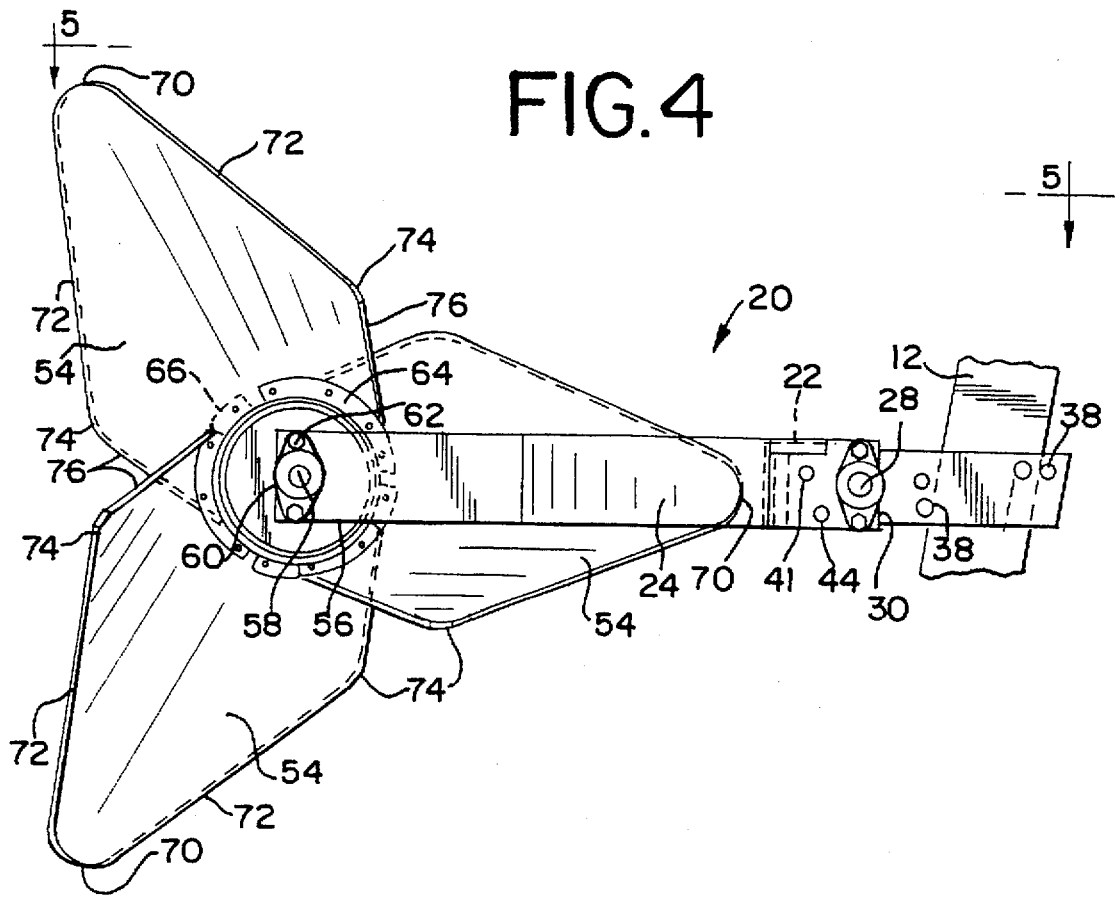
FIG. 4 is a side view of the apparatus shown in FIG. 1.
Figure 5:
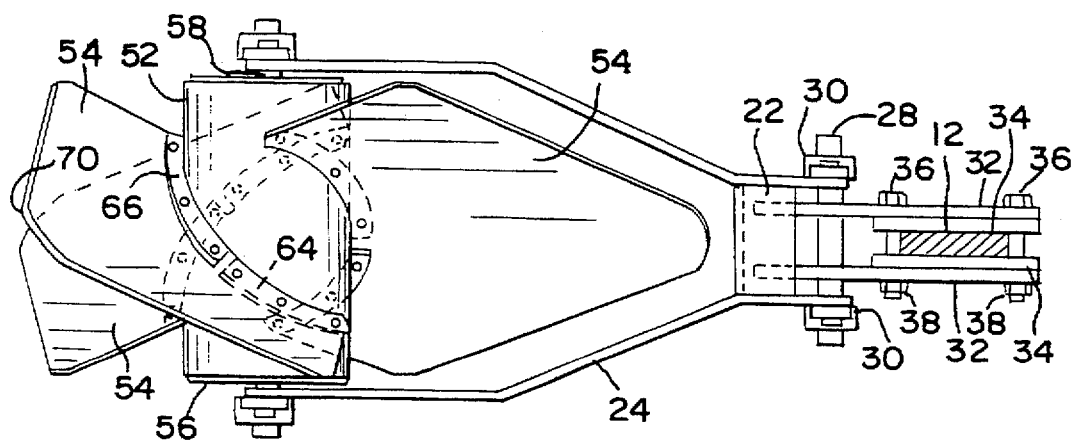
FIG. 5 is a top view of the apparatus shown in FIG. 4 and particularly illustrating the cultivator shank in cross-section.

The apparatus 10 has a frame structure, indicated generally at 20, comprising a transverse frame member 22 to which side members 24 are attached, preferably by welding. The side members 24 are angled from a wide position relative to one another to a narrower position at the front where they are conned to transverse member 22, as best shown in FIGS. 1 and 5. These side members 24 have an aperture through which a pin means 28 passes for the purpose of pivoting the trailing portion of the apparatus relative to the shank 12. The pin 28 is secured by journals 30 also passes through apertures in side mounting members 32. The side mounting members 32 have adjacent spacing members 34 and bolts 36 with suitable nuts 38 hold the apparatus firmly against the sides of the shank. The side members 24 have at least a pair of apertures 42 and 44 which are aligned with similar apertures in the side plates 32 as shown in FIG. 4 so that a holding pin or bolt can be passed through one of the apertures 42 or 44 to hold the apparatus in either the position shown or in a raised position if it is not being used.

In accordance with an important aspect of the present invention, the frame 20 carries a rotatable working mechanism, indicated generally at 50, which comprises a core 52 and a number of blades 54, three of which are shown in the preferred embodiment. The core 52 has end plates 56 preferably welded thereto and an axle 58 which is journaled in a bushing 60 that is bolted to the frame 24 by bolts 62. The core 52 in the preferred embodiment has a relatively large diameter, approximately 6 inches, although it could be greater or smaller, if desired.

The size of the core presents a relatively large surface contact with the blades 54 so that they can be strongly attached thereto. The core also has a number of curved mounting strips 64 and 66 welded to the outer surface of the cylindrical core on opposite sides of the blades to which the blades are attached by bolts 68. The total length of the blade surface that is in contact with the mounting strips 64 and 66 is approximately 12 inches and the individual curved strips are approximately 6 inches long and 1 inch high, with three bolts 68 attaching each strip to approximately one-half of the width of each blade. The bolts are preferably flanged head bolts and flanged nuts are also preferred. Both the nut and bolt flanges are preferably serrated so as to dig in the metal when tightened which is effective to keep them from loosening during operation of the apparatus. The strips 64 are on the front side of the blade, whereas the strips 66 are behind the blade as shown in FIG. 1.

While the preferred embodiment is illustrated with three blades 54 attached to the core 52, there can, of course, be a greater or lesser number of the same. Also, the blades are shown to be flat with the center portion terminating in a tip 70 of greatest height and the sides 72 are relatively straight and terminate at a side extreme location 74 and then have return portions 76 that extend to the core 52.

In accordance with an important aspect of the present invention, the configuration of the blades which has the center portion the furthest from the core results in deeper penetration of that portion of the blade in the center of the row space, which is typically the deepest part of the row space between adjacent rows. This has the effect of increasing the height of the mounds that are formed on the opposite sides of the depression that is dug out by the blade as the working mechanism 50 rotates during operation. It has been found that when the apparatus is moved through the field while engaged, the tip 70 of a blade begins to dig in to the soil and tends to push dirt forwardly as it turns. The pushed dirt tends to form a ridge or mound that extends substantially across the row space between rows and as it continues to turn, it also digs out the depression and moves dirt to the rear or the other side of the depression as it continues to rotate. Also, during operation the entire working mechanism 50 tends to move vertically a relatively small distance, and this movement is permitted by the pivoting of the frame side members 24 about the pin 30. It has been found that the shape of the depressions and mounds is optimized when such vertical movement is permitted, particularly when the apparatus is used with the ripper blade 16 which breaks up the soil so that it is easier to work. If a ripper blade 16 is not used, it may be necessary to lock the side members so that such vertical movement is prevented, or apply weight to the working mechanism 50 to create more depth of the depressions in hard to work soil.

Figure 3:
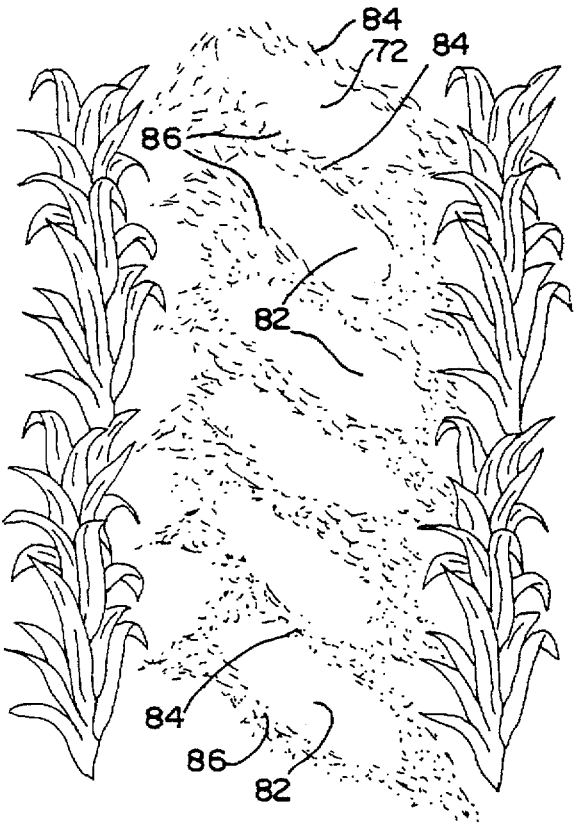
FIG. 3 is a perspective view of two rows of crops with the row space having been worked by operation of the apparatus of the present invention.

The net effect of the operation of the apparatus is shown in FIG. 3 which has the depressions 82, each of which is formed by an individual blade 54, a forward mound portion 84 and a rear mound portion 86. Obviously, the rearward mound portion 86 of a given depression 82 will tend to merge with the forward mound of the following depression 72 as is desired.

It should be understood that while the outer configuration of the blades 54 could be varied to change the shape of the resulting depressions and mounds, the shape shown in the drawings has been found to be quite effective in producing the desired configuration of the mounds and depressions. The angle of the blades is approximately 45 degrees relative to the axle 58 and tends to produce depressions that are oriented at a 45 degree angle between rows in the row space. The angles while preferred to be approximately 45 could be within the range of 30 to 60 degrees, if desired. The more the orientation of the depressions approaches transverse, the greater the likelihood that the undesirable bouncing, vibration and jostling of the equipment during a subsequent farming operation would occur.

It is noted that the blades 54 could be welded to the core 52, but it has been found that it is easier to manufacture the product with the bolted configuration and also the use of the bolted configuration enables blades to be replaced if they happen to be damaged during operation or otherwise.

It has also been found that when the apparatus is out of operating position, such as when it is being transported from one field location to another over the road or the like, the blades 54 tend to exhibit a windmilling effect which can become quite rapid. Because the blades are made of steel and are relatively heavy, it can obviously present a safety hazard. For this reason, a pin locking mechanism 80 is provided in transverse member 22 which can be removed for operation and the pin impinges upon the blade tip 70 to keep it from rotating.

It is also important that the mounds and depressions extend substantially across the entire row space so that water cannot run around them and create an undesirable run-off condition. The size of the apparatus can be varied depending upon the row spacing of the row crop. Generally, the spacing between rows can vary between 20 to 30 inches, with some crops being planted as narrowly as 16 inches. The size of the blades and length of the core 52 can be determined for the apparatus to accommodate the appropriate row spacing if necessary and such modification is certainly within the knowledge of those of ordinary skill in the art.

From the foregoing, it should be appreciated that a simple, efficient and effective apparatus for making depressions and mounds has been shown and described which offers superior operating advantages. Most notably, the present invention effectively minimizes run-off of water while providing a series of depressions and mounds that are oriented at an angle so that undesirable and potentially damaging bouncing, vibration and jostling of equipment and operators is substantially eliminated. The size of the depressions, which preferably are approximately 18 inches long, 6 inches deep and 6 inches wide, provides a plurality of water retaining reservoirs which keep rain where it falls and where expensive fertilizer and herbicides and the like are applied.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. Apparatus for forming liquid retaining elongated depressions in an agricultural field during movement in a forward direction, and in the row space between adjacent crop rows, said apparatus being adapted for use with a farming vehicle having an associated implement, said apparatus comprising:

a frame for mounting said apparatus to one of the vehicle and the implement;

a core means carried by said frame and being rotatably journaled thereto, said core means including at least one blade attached thereto, said at least one blade being adapted to create an elongated depression with raised sides in the field during rotation of said core means, said depression being oriented at an acute angle relative to the direction of travel of the vehicle and extending substantially across the entire row space for substantially preventing liquid runoff down the row space, said at least one blade being disposed on said core means so that as the vehicle proceeds in the direction of travel, a series of said depressions is formed in linear array, separated by forward and rear mounds, said mounds and said depressions being disposed at said acute angle to the direction of travel.

2. Apparatus as defined in claim 1 wherein said core means is generally cylindrical, is provided with a longitudinal axis, and is oriented generally horizontally and generally transverse to the direction of forward movement, said core means including at least three blades attached thereto, said blades being oriented at an angle relative to the axis of said core means to thereby form said elongated depressions at said acute angle relative to the direction of travel of the vehicle.

3. Apparatus as defined in claim 2 wherein each of said blades is generally flat with opposite ends and a maximum height relative to the axis of said core means generally midway between the ends thereof, the length between opposite ends of each said blade being sufficient to form said elongated depressions and raised mounds.

4. Apparatus as defined in claim 1 wherein said implement is adapted to perform a farming operation on a plurality of rows, said apparatus being provided to form said elongated depressions between substantially each of said adjacent rows.

5. Apparatus for forming a plurality of elongated depressions between rows of a row crop agricultural field, said apparatus being adapted for attachment to one of a farming vehicle and an implement connected to the vehicle, said apparatus being adapted to form the depressions as said vehicle moves down the rows in a forward direction, said apparatus comprising:

an elongated rotatable core means having at least one blade attached thereto, said at least one blade being adapted to create said elongated depressions during rotation of said core means, said depressions having raised sides including forward and rear mounds relative to the general elevation of the ground between rows of the field, wherein each of said blades has a predetermined length between opposite end portions, the length of each blade extending substantially across the distance between rows so that said depressions also extend substantially across the distance between rows for substantially preventing liquid runoff down the row space and said depressions and said mounds being oriented at an acute angle relative to the direction of said rows;

a frame for attaching said core means and for mounting said apparatus to one of the implement and the vehicle.

6. Apparatus as defined in claim 5 wherein the implement is a single row implement, there substantially being a core means between two adjacent crop rows so that depressions are formed between said adjacent rows.

7. Apparatus as defined in claim 5 wherein said core means comprises an elongated cylindrical portion to which said at least one blade is attached, said core means having at least three blades generally equally spaced around the circumference of said cylindrical portion, said cylindrical portion having a longitudinal axis, at least one of said blades being in contact with the ground as said core means rotates during movement of said vehicle.

8. Apparatus as defined in claim 7 wherein each of said blades has a predetermined maximum height relative to the axis of said cylindrical portion, the height of each said blade increasing from each end portion to the center portion thereof.

9. Apparatus as defined in claim 5 wherein said frame is vertically pivotable relative to the one of the implement and vehicle that said apparatus is mounted to.

10. A method of preparing a row crop agricultural field during a farming operation by a vehicle and associated implement to reduce water run-off along the rows of the agricultural field, while providing a ground surface characteristic that minimizes machine and operator jostling during a subsequent farming operation for a wheeled vehicle moving through the field, said method comprising:

rotating a core means having a number of relatively flat blades each having a length measured between the widest points of said blade and extending at least approximately the length of said core means as the vehicle moves through the field, so that the blades dig into the field and form acutely angled elongated depressions bordered by forward and rear mounds that extend substantially across the space between rows, the acutely angled orientation of said depressions and mounds relative to the rows presenting a sufficiently uniform contacting surface for the wheels of a vehicle moving down the rows of the field during a subsequent farming operation so that machine and operator jostling is minimized.

11. A method as defined in claim 10 wherein said acute angle is within the range of about 30 degrees to about 60 degrees.

12. A method as defined in claim 10 wherein the width of the rows is within the range of about 18 to 44 inches and each of the depressions is oriented at about 45 degrees relative to the direction of the rows and the depressions are generally elliptically shaped and about 4 to 6 inches deep, about 4 to 6 inches wide at the widest point and about 20 to 24 inches long.

13. A method as defined in claim 10 wherein the sides of the depressions are also raised to form a dam-like mounds which minimize flow of water down the row space between adjacent rows.

14. A method as defined in claim 13 wherein said blades dig the deepest in the middle of the space between rows to maximize the height of the mounds in the middle of the row space between adjacent rows.

15. Apparatus for forming liquid retaining elongated depressions in an agricultural field with crops planted in rows, during movement in a forward direction, said apparatus being adapted for use with a farming vehicle having an associated implement, said apparatus comprising:

a frame for mounting said apparatus to one of the vehicle and the implement;

a core means carried by said frame and being rotatably journaled thereto, said core means including at least one blade attached thereto, said at least one blade being adapted to create an elongated depression with raised sides in the field during rotation of said core means, said depression being oriented at an acute angle relative to the direction of travel of the vehicle;

said core means is generally cylindrical, is provided with a longitudinal axis, and is oriented generally horizontally and generally transverse to the direction of forward movement, said core means including a plurality of blades attached thereto, said blades being oriented at an angle relative to the axis of said core means to thereby form said elongated depressions and forward and rear mounds at said acute angle relative to the direction of travel of the vehicle;

each of said blades being generally flat with opposite ends and a maximum height relative to the axis of said core means generally midway between the ends thereof, the length between opposite ends of each said blade being sufficient to form said elongated depressions and raised sides that extend substantially across the row space between rows so that liquid is substantially precluded from running down the row space.

* * * * *